United States Patent
Huizing (10) Patent No.: US 9,255,744 B2
(45) Date of Patent: Feb. 9, 2016

(54) COATED MEMBRANES FOR ENTHALPY EXCHANGE AND OTHER APPLICATIONS

(75) Inventor: Ryan Nicholas Huizing, Vancouver (CA)

(73) Assignee: DPOINT TECHNOLOGIES INC., Vancouver, BC (CA)

( * ) Notice: Subject to any disclaimer, the term of this patent is extended or adjusted under 35 U.S.C. 154(b) by 980 days.

(21) Appl. No.: 13/321,016

(22) PCT Filed: May 17, 2010

(86) PCT No.: PCT/CA2010/000735
§ 371 (c)(1),
(2), (4) Date: Nov. 18, 2011

(87) PCT Pub. No.: WO2010/132983
PCT Pub. Date: Nov. 25, 2010

(65) Prior Publication Data
US 2012/0061045 A1    Mar. 15, 2012

Related U.S. Application Data (60) Provisional application No. 61/179,026, filed on May 18, 2009.

(51) Int. Cl.
*F23L 15/02* (2006.01)
*F28D 21/00* (2006.01)
(Continued)

(52) U.S. Cl.
CPC .......... *F28D 21/0015* (2013.01); *B01D 53/268* (2013.01); *B01D 67/0079* (2013.01);
(Continued)

(58) Field of Classification Search
CPC ..... F28D 20/02; F28D 20/021; F28D 20/023; Y02E 60/145; B01D 69/125; B01D 69/12; B01D 63/0088; B01D 71/021; B01D 71/52; B01D 71/54; B01D 71/70
USPC ................ 165/4, 10, 54; 428/319.3; 427/245, 427/393.5
See application file for complete search history.

(56) References Cited

U.S. PATENT DOCUMENTS

| 3,666,007 A | 5/1972 | Yoshino et al. |
| 4,040,804 A | 8/1977 | Harrison |

(Continued)

FOREIGN PATENT DOCUMENTS

| CA | 2667579 | 5/2008 |
| EP | 0 661 502 | 7/1995 |

(Continued)

OTHER PUBLICATIONS

"Heat and moisture transfer in application scale parallel-plates enthalpy exchangers with novel membrane materials," J. Mem. Sci. 325, 2008, Zhang, L.

(Continued)

*Primary Examiner* — Travis Ruby
(74) *Attorney, Agent, or Firm* — Clark & Brody (57) ABSTRACT

Coated membranes comprise a porous desiccant-loaded polymer substrate that is coated on one surface with a thin layer of water permeable polymer. Such membranes are particularly suitable for use in enthalpy exchangers and other applications involving exchange of moisture and optionally heat between gas streams with little or no mixing of the gas streams through the membrane. Such membranes have favorable heat and humidity transfer properties, have suitable mechanical properties, are resistant to the crossover of gases when the membranes are either wet or dry, and are generally low cost.

9 Claims, 7 Drawing Sheets

(51) Int. Cl.
- *B01D 53/26* (2006.01)
- *B01D 67/00* (2006.01)
- *B01D 69/10* (2006.01)
- *F24F 3/14* (2006.01)
- *F24F 12/00* (2006.01)
- *B01D 69/14* (2006.01)
- *B01D 71/80* (2006.01)
- *B01D 71/02* (2006.01)
- *B01D 71/52* (2006.01)
- *B01D 71/54* (2006.01)

(52) U.S. Cl.
CPC .............. *B01D69/10* (2013.01); *B01D 69/105* (2013.01); *B01D 69/147* (2013.01); *B01D 71/80* (2013.01); *F24F 3/1411* (2013.01); *F24F 12/006* (2013.01); *B01D 71/027* (2013.01); *B01D 71/52* (2013.01); *B01D 71/54* (2013.01); *B01D 2323/30* (2013.01); *B01D 2325/48* (2013.01); *F24F 2003/1435* (2013.01); *Y02B 30/563* (2013.01); *Y10T 428/249991* (2015.04)

(56) References Cited

U.S. PATENT DOCUMENTS

| | | | |
|---|---|---|---|
| 4,377,400 | A | 3/1983 | Okamoto et al. |
| 4,449,992 | A | 5/1984 | Yamada et al. |
| 4,911,227 | A | 3/1990 | Saito et al. |
| 5,002,590 | A | 3/1991 | Friesen et al. |
| 5,273,689 | A | 12/1993 | Hamasaki |
| 5,401,706 | A | 3/1995 | Fischer |
| 5,496,397 | A | 3/1996 | Fischer et al. |
| 5,617,913 | A | 4/1997 | DeGregoria et al. |
| 5,624,610 | A | 4/1997 | Yokoya et al. |
| 6,145,588 | A | 11/2000 | Martin et al. |
| 6,228,506 | B1 | 5/2001 | Hosatte et al. |
| 6,242,135 | B1 | 6/2001 | Mushiake et al. |
| 6,270,902 | B1 | 8/2001 | Tedeschi et al. |
| 6,361,588 | B1 | 3/2002 | Moratalla |
| 6,413,298 | B1 | 7/2002 | Wnek et al. |
| 6,536,514 | B1 | 3/2003 | Sugiyama |
| 6,635,384 | B2 | 10/2003 | Bahar et al. |
| 6,684,943 | B2 | 2/2004 | Dobbs et al. |
| 6,841,601 | B2 | 1/2005 | Serpico et al. |
| 6,951,242 | B1 | 10/2005 | DesChamps et al. |
| 7,152,670 | B2 | 12/2006 | Dobbs et al. |
| 7,188,665 | B2 | 3/2007 | Arai et al. |
| 7,331,376 | B2 | 2/2008 | Gagnon et al. |
| 2007/0237958 | A1* | 10/2007 | Eramo .......................... 428/407 |
| 2009/0071638 | A1 | 3/2009 | Murayama et al. |
| 2010/0031817 | A1 | 2/2010 | Ehrenberg et al. |
| 2010/0273901 | A1 | 10/2010 | Ehrenberg et al. |

FOREIGN PATENT DOCUMENTS

| | | |
|---|---|---|
| EP | 1 553 354 | 7/2005 |
| JP | 62-027004 | 2/1987 |
| JP | 02-187477 | 7/1990 |
| JP | 07-155527 | 6/1995 |
| JP | 07-174373 | 7/1995 |
| JP | 2001-259348 | 9/2001 |
| JP | 2002-029904 | 1/2002 |
| JP | 2002-035533 | 2/2002 |
| JP | 2002-146070 | 5/2002 |
| JP | 2002-535116 | 10/2002 |
| JP | 2004-182916 | 7/2004 |
| JP | 2004-535270 | 11/2004 |
| JP | 2008-540199 | 11/2008 |
| WO | 2008/037079 | 4/2008 |
| WO | 2008/089484 | 7/2008 |
| WO | 2009/002984 | 12/2008 |

OTHER PUBLICATIONS

"Membrane modules for building ventilation, Chemical Engineering Research and Design 80 (2002) 53-64", K.R. Kistler, E.L. Cussler.

* cited by examiner

Cooling Conditions:

FIG. 4b

Heating Conditions:

COATED MEMBRANES FOR ENTHALPY EXCHANGE AND OTHER APPLICATIONS

CROSS-REFERENCE TO RELATED APPLICATIONS

This application is related to and claims priority benefits from U.S. Provisional Patent Application Ser. No. 61/179,026, entitled "Coated Membranes for Enthalpy Exchange and Other Applications", filed on May 18, 2009, which is hereby incorporated by reference in its entirety.

FIELD OF THE INVENTION

The present invention relates to membranes comprising a porous, desiccant-loaded polymer substrate that is coated on one surface with a thin layer of water permeable polymer. Such membranes are particularly suitable for use in enthalpy exchangers and other applications involving exchange of moisture and optionally heat between gas streams with little or no mixing of the gas streams through the membrane.

BACKGROUND

A heat recovery ventilator (HRV) is a mechanical device that incorporates a heat exchanger with a ventilation system for providing controlled ventilation into a building. The heat exchanger heats or cools the incoming fresh air using the exhaust air. Devices that also exchange moisture between the two air streams are generally referred to as Energy Recovery Ventilators (ERV), sometimes also referred to as Enthalpy Recovery Ventilators or enthalpy exchangers.

In order for buildings to have good indoor air quality they require an exchange of the stale indoor air with fresh outdoor air. An ERV can be used for this purpose, and incorporates a method to remove excess humidity from, or add humidity to, the ventilating air that is being brought into a building. In addition to improving indoor air quality in buildings, installation of an ERV will result in energy savings. For example, in hot and humid climates, useable energy is wasted when the cooled air from the building is exhausted. In an ERV the exhaust air can be used to cool the warmer air being brought in from the outside, reducing the energy consumption load on the air conditioner and the energy associated with air conditioning. With proper design, the size of the air conditioner can be reduced. If buildings tend to be too humid, ERVs can lower humidity levels, reducing the likelihood of mould, bacteria, viruses, and fungi which cause sickness, absenteeism and lost productivity. On the other hand, in cold dry climates, energy is wasted when warm air from the building is exhausted, plus there can be an additional issue of the incoming air stream being too dry. As well as transferring heat from the exhaust air to the incoming air, ERVs can be used to recycle water vapor from the exhaust stream, raising humidity levels, thereby reducing skin irritation, dryness, and respiratory symptoms caused by dry air.

A key component in the ERV system which transfers the heat and humidity between the air streams is called the ERV core. The two most common types of ERV are those based on planar membrane plate-type devices and those based on rotating enthalpy wheel devices. Planar plate-type ERV cores comprise layers of water permeable membrane. The two air streams are directed through alternate layers, or on opposite sides, of the ERV core, and heat and humidity is transferred via the membrane. Enthalpy wheel ERVs (also known as energy wheels) typically have a cylindrical or disc-shaped honeycomb core that is coated with desiccant. A motor rotates the cylinder, transferring the heat and humidity between the intake and exhaust air streams. ERV systems typically also comprise an enclosure, pumps or fans to move the air streams, ducting, as well as filters, control electronics and other components.

Since the air is being exhausted primarily to remove stale and contaminated air from the building, preferably the exhaust stream should not be able to mix with the incoming stream on the opposite side of the membrane as the two streams pass through the ERV. However, in many cases there is crossover contamination (leakage between streams) due to leakage at seals or joints in the ERV and/or due to passage of the gases through the membrane material.

Preferably the membrane used in an ERV core is thin to allow adequate exchange of heat between the two streams, driven by the temperature gradient between the streams. The membrane is also water permeable to allow moisture to pass through the material, driven by the vapor pressure differential or water concentration gradient between the two streams. Thinner membranes will tend to have higher heat and moisture transport rates. Ideally the membrane is also impermeable to air, and contaminant gases, to prevent the mixing and crossover of the two streams through the membrane.

Membranes that have been used or suggested for ERV applications include cellulose films; cellulose fiber or glass fiber papers or porous polymer films that are coated or impregnated with a hydrophilic polymer or a hydrophilic polymer-desiccant mixture; thin film composites manufactured via interfacial polymerization; laminated membranes made from a blown film on a non-woven support layer; laminated membranes comprising an ionomer film bonded to a porous support; and sulphonated and carboxylated ionomer films. All of these materials have shortcomings however. For example, cellulose films are not mechanically and dimensionally stable in wet conditions, tend to be subject to freeze/thaw cracking, and are typically fairly thick (for example, greater than 10 micron) which leads to lower water permeability. In the presence of liquid water, water-soluble components tend to wash off papers or polymer films that are coated with hydrophilic polymers and/or polymer-desiccant mixtures. When a desiccant is added to the coating, this can necessitate high loadings of desiccant (>80%) and thick coating layers in order to block gas transport; this can reduce water transport. Cellulose films and coated papers also tend to be flammable and subject to microbial growth. In the case of thin film composites manufactured via interfacial polymerization, monomers are reacted on the surface of a porous polymeric substrate to make a chemically-bound water permeable coating, in order to reduce the problem of the coating washing off. Such membranes tend to be costly and their fabrication involves the use of organic solvents and other harsh chemicals. Also, the types of additives that can be incorporated are limited by the chemistry involved. Laminated membranes made by bonding a cast ionomer film to a porous support, or a blown film (for example, polyether-block amide (PEBA)) laminated to a nonwoven tend to delaminate because of the different dimensional properties (for example, swelling and thermal expansion) of the two layers and the difficulty in creating a strong bond between them. Also, the water transport performance of such laminated membranes tends to be limited because the ionomer or blown film has to be sufficiently thick (for example, greater 5 micron) so that it can be processed into a continuous, pinhole-free film and then handled in order to manufacture the laminate. Sulphonated and carboxylated ionomer films such as Nafion® and sulfonated polyether ether ketones (sPEEK) tend to be expensive and often have poor dimensional stability under wet conditions. Furthermore these ionomeric polymers tend to be subject to contamination and poisoning due to the potential for contaminants to bind to the reactive ionic moieties of the polymer chain.

Desirable properties of a membrane for enthalpy exchangers, and other applications involving exchange of moisture and optionally heat between gas streams with little or no mixing of the gas streams through the membrane, generally include the following:

High water permeation (vapor and liquid);
High water absorption;
Low or zero air and contaminant gas permeation;
Non-flammable;
Resistance to microbial growth;
Favorable mechanical strength and properties when dry or when wet, so that the membrane is easy to handle, does not tear easily and preferably will accept and hold a pleat;
Good dimensional stability in the presence of liquid water and washable, allowing cleaning for maintenance purposes without damaging or compromising the functionality of the ERV core;
Long lifetime under the required operating conditions, without detrimental leaching or loss of membrane components and without significant degradation in water transport performance or increased contaminant crossover;
Tolerance of freeze/thaw cycles in the presence of liquid water condensation without significant deterioration in performance;
Low cost;
Can be manufactured without use of organic solvents or harsh chemicals.

Often the above represent conflicting requirements. For example, materials which have low air permeability tend to also have low water permeability; polymer films provide excellent handling, but tend to be rather flammable; and specialty polymers and highly engineered thin film composites and similar materials tend to be very expensive.

The coated membranes described herein offer advantages over previously used membranes in some or all of the above areas.

SUMMARY OF THE INVENTION

A water transport membrane comprises a porous substrate with a coating formed on one surface thereof, wherein the substrate comprises a desiccant-loaded polymer film and the coating comprises a water permeable polymer. Preferably the polymer coating is non-ionic and is selectively permeable to water. The polymer coating can be cross-linked; this tends to render it less water-soluble. In preferred embodiments the water transport membrane is substantially air-impermeable. The coating can further comprise flame retardant, microbicide and/or other additives.

A method for making a water transport membrane comprises applying a solution comprising a water permeable polymer to one surface of a porous desiccant-loaded polymeric substrate, and drying the coated substrate to form a substantially continuous coating of the water permeable polymer on one surface of the substrate. Preferably the polymer coating is non-ionic and is selectively permeable to water. The water permeable polymer can be cross-linked, preferably after it is applied to the substrate, to form a substantially continuous coating of the cross-linked water permeable polymer on one surface of the substrate. The solution can be an aqueous solution. The solution can further comprise a cross-linking agent for cross-linking the water permeable polymer, and/or microbicide, flame retardant and/or other additives. In some embodiments of the method, the solution further comprises a water-soluble polymer, and the method further comprises treating the dried coated substrate with water to at least partially dissolve and remove the water-soluble polymer from the coating.

A water transport membrane is provided that is made by applying a solution comprising a water permeable polymer to one surface of a porous substrate comprising a desiccant-loaded polymer film, and drying the substrate so that the membrane comprises a substantially continuous coating of the water permeable polymer formed on one surface of the substrate. The water permeable polymer can be cross-linked, preferably after it is applied to the substrate, to form a substantially continuous coating of the cross-linked water permeable polymer on one surface of the substrate.

A water transport membrane is also provided that is made by applying a solution comprising a water permeable polymer and a water-soluble polymer to one surface of a porous substrate comprising a desiccant-loaded polymer film; then cross-linking the water permeable polymer and drying the substrate to form an intermediate membrane with a coating comprising the water-soluble polymer and the cross-linked water permeable polymer on one surface of the substrate. The intermediate membrane is treated with water to at least partially dissolve and remove the water-soluble polymer from the coating, whereby the water transport membrane comprises a substantially continuous coating comprising cross-linked water permeable polymer on one surface of the substrate.

A preferred embodiment of a water transport membrane comprises a porous silica-loaded polyethylene substrate with a coating comprising a cross-linked, water permeable, non-ionic polyurethane-polyether polymer formed on one surface thereof. Such a membrane can be made by the above-described method. In some embodiments the loading of the coating on the substrate is in the range of about 0.25 g/m$^2$ to about 15 g/m$^2$. In some embodiments the loading of the coating on the substrate is in the range of about 0.5 g/m$^2$ to about 5 g/m$^2$. In some embodiments the silica loading is in the range of 45% to 80% by weight of the substrate. In some embodiments the thickness of the substrate is in the range of about 40 micron to about 150 micron, and the substrate has greater than about 50% porosity. In some embodiments the thickness of the substrate is in the range of about 40 micron to about 110 micron.

The water transport membranes described above, and water transport membranes made by the above-described methods can be used in an energy recovery ventilator core. For example, an energy recovery ventilator core comprises a water transport membrane comprising a porous substrate with a water permeable coating formed on one surface thereof, wherein the porous substrate comprises a desiccant-loaded polymer film and the coating comprises a water permeable polymer.

A method for transferring heat and humidity between an air intake stream and an air exhaust stream of a building comprises directing the intake and exhaust air streams on opposite sides of the present energy recovery ventilator core. For example, the core can comprise a water transport membrane comprising a porous substrate with a water permeable coating formed on one surface thereof, wherein the substrate comprises a desiccant-loaded polymer film and the coating comprises a water permeable polymer. In some embodiments of the method the intake air stream is directed so that it contacts the coated surface of the water transport membrane.

The present membranes are preferably coated on just one surface to give an anisotropic membrane. However, membranes with different properties and water transport characteristics can be obtained by applying a coating solution to both sides of the substrate. This provides a water transport membrane comprising a coating formed on both surfaces thereof, wherein the substrate comprises a desiccant-loaded polymer film and the coatings comprises a water permeable polymer. Again, preferably the polymer coating is non-ionic and is selectively permeable to water.

DETAILED DESCRIPTION OF EMBODIMENTS OF THE INVENTION

In the present approach improved water transport membranes comprise a porous desiccant-loaded polymer substrate that is coated on one surface with a thin layer of water permeable polymer that is preferably cross-linked. Such anisotropic (or asymmetric) coated membranes have been found to provide a high degree of moisture transport, while substantially blocking the transport of air and contaminant gases when the membranes are either wet or dry. The membranes also have suitable mechanical properties so that they are easy to handle and process, are robust in end-use applications such as ERV applications, and are generally low cost. The membranes can also be made to be flame resistant and have microbial resistance.

The substrate, the coating and optional additives are selected to give a membrane with desirable properties for the particular end-use application.

Since water and water vapor are transported through the membrane, the resistance to water transport through each component or layer of the membrane will affect the overall water transport rate. Preferably the substrate has suitable mechanical properties and is thin with high porosity, so as to reduce its resistance to water and heat transport. Preferably the water permeable coating is also thin so as to reduce its resistance to water transport and is firmly bonded to the substrate. If the substrate is a highly porous material with a large pore size, the coating will tend to penetrate the pores prior to drying, leading to a polymer-filled substrate (impregnation). This is not desirable as an impregnated polymer (for example, filling the pores) will tend to have a greater resistance to water transport than a thin surface coating. Thus, the substrate preferably has high porosity but a small pore size, so that the water permeable polymer solution will not penetrate too deeply into the pores.

Substrate

In the present approach the porous substrate is a desiccant-loaded polymer film. The polymer film provides mechanical support, strength and handling capability to the final membrane. The desiccant, as defined herein, is a hygroscopic material or hydrophilic material, generally in a powder or particulate form, that is substantially inert (at least in the expected end-use application for the membrane), and is insoluble in water. The desiccant provides a high surface area to which the water permeable coating can be applied. In the present approach, although the coating is typically cross-linked, it does not chemically react with the substrate. The high surface area desiccant improves the mechanical adherence of the coating to the substrate, and can also improve the lifetime of the coated membrane. The small pore size and tortuosity of the desiccant-loaded polymer film reduces the tendency for the coating to penetrate into the pores or thickness of the substrate.

The presence of a desiccant in the substrate renders it absorptive to water condensate and water vapor. This is believed to help bring condensate from the surface of the membrane through the thickness of the membrane to a drier gas stream on the other side. Also, since dense coatings tend to have higher water transport rates when in contact with high partial pressure of water, by providing liquid water to the coating surface through the substrate, the overall water transmission rate may be increased.

The presence of a desiccant in the substrate can also facilitate the application of the water permeable polymer coating solution during the fabrication of the coated membrane since the surface tends to be more wettable than it would be if the desiccant was not present.

Preferably the substrate is non-flammable, as this will typically be a requirement of the final membrane. Since the substrate tends to constitute the bulk of the final membrane, if the substrate is flame resistant, then it can be expected that the membrane itself will also be flame resistant. Preferably the substrate does not promote and/or is resistant to microbial growth.

The substrate provides most of the mechanical support and largely determines the handling characteristics of the final membrane. For ERV applications, preferably it has the mechanical properties required in order be formed into an ERV core and to be integrated into the ERV device. These typically include properties such as the ability to hold a pleat or fold, the ability to be thermo-formed, tear-resistance, sufficient rigidity to support itself between ribs or other supports without undue deformation, and in some cases the ability to be thermally-, vibration- or ultrasonically-welded.

The thickness of the substrate is generally in the range of about 10-250 micron. In preferred embodiments the thickness of the substrate is in the range of about 20-180 micron, and is more preferably in the range of about 40-150 micron, and even more preferably in the range of about 40-110 micron. The porosity of the substrate is generally in the range of about 30 to 90% and is preferably greater than 50%, and more preferably greater than 70%. The average pore size is preferably in the range of 0.005 to 1 micron, or more preferably in the range of 0.005 to 0.5 micron, and is most preferably in the range of about 0.05 to 0.3 micron. In preferred embodiments the desiccant-loading of the substrate is in the range of about 25-85% by weight, and is preferably greater than 50%, and more preferably in the range of about 45-80% by weight. At higher desiccant loadings the substrate tends to have reduced mechanical strength, whereas at lower loadings the substrate is less hydrophilic so tends to be less wettable and more difficult to coat.

Higher porosity and lower thickness in the substrate helps decrease the resistance to water and water vapor transport through the substrate portion of the membrane. High porosity and low thickness are desired with the constraint of handling and mechanical strength. The pore size is preferably just small enough to allow a continuous coating of polymer to be formed on the surface of the substrate.

In examples of suitable porous desiccant-loaded polymer films that can be used as substrates, the polymer can be, for example, a polyolefin such as polyethylene (PE) or polypropylene (PP), or polyvinylchloride (PVC). Ultrahigh molecular weight (UHMWPE) polyethylene polymers are preferred as they generally have higher strength and greater thermal tolerance and durability. Suitable desiccants include silica, titania, molecular sieves and alumina, with silica being particularly preferred. Different forms of silica can be used. For example, precipitated silicas are typically used in microporous substrates and have high surface areas due to macro and mesopores in the silica. The surfaces of the silica contain O—H groups rendering them hydrophilic to water and absorptive to water vapor. Silica gels and fumed silicas may also be used to impart increased absorption in the substrate under certain vapor pressure conditions.

Substrates that have been found to be particularly suitable to make coated-membranes for ERV applications are microporous silica-filled polyethylene materials. Such materials are available from PPG Industries as Teslin® substrates. These are dimensionally stable, highly filled, single layer, microporous films. Teslin® substrates are available in different grades and are polyolefin-based with about 60% of their weight being finely divided particulate siliceous, non-abrasive filler and about 65% of their volume being void space or air. Similar substrates are also available commercially from Daramic, ENTEK and NSG who offer microporous polymeric battery separator materials consisting primarily of ultrahigh-molecular weight polyethylene and silica. Microporous PVC-silica separators from Amer-Sil can also be used, although they were found to be less suitable for applications requiring pleating of the coated membrane.

Microporous silica-filled polyolefin substrates have also been found to be suitable for fuel cell humidifier applications, although some degradation occurred on prolonged use at elevated temperatures.

Figure 1:
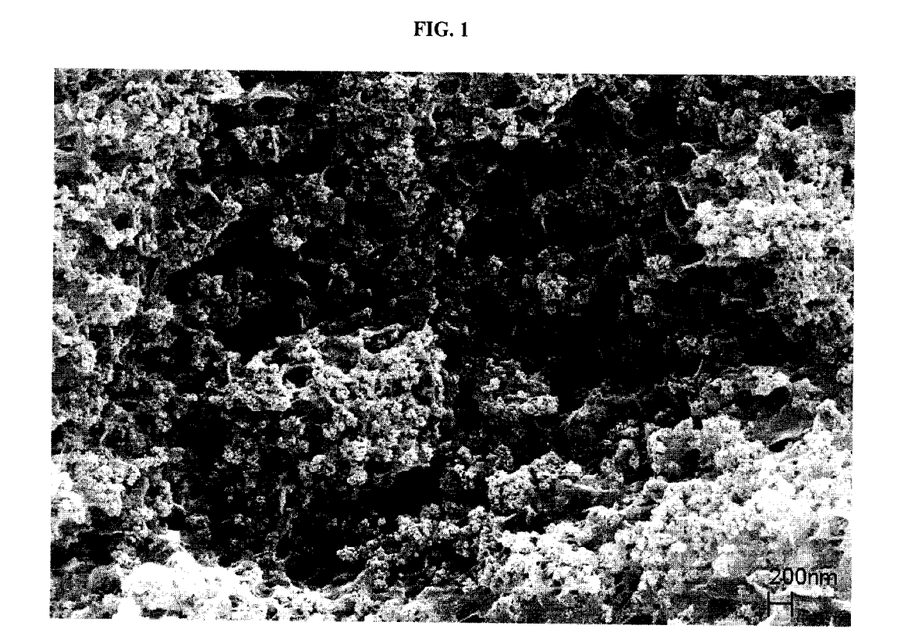
FIG. 1 is scanning electron microscope image of a porous desiccant-loaded polymer substrate showing the surface to which a thin water permeable polymer coating is applied.

FIG. 1 is a scanning electron microscope (SEM) image of one surface of a porous desiccant-loaded polymer substrate showing the surface to which a thin water permeable polymer coating is applied. The sample is a commercially available silica-loaded UHMWPE substrate with about 60-75% silica by weight, and about 50-60% porosity and a thickness of 180 micron.

Desiccant-loaded polymer films, such as the porous substrates described above, have been used without a polymer coating in fuel cell, ERV and other applications. They can provide sufficient water transport, but gas crossover tends to be a problem particularly when the material is dry or at low humidity. There are also known examples of water transport membranes that have been made by coating or impregnating a porous polymer film with a water permeable polymer. In some cases desiccants and/or other additives have been mixed with a polymer solution before it is applied to the porous polymer film as discussed in the Background section above.

By using a porous, desiccant-loaded substrate as described herein, the substrate material itself will assist in moisture vapor transport, and the application of a thin coating of water permeable polymer is used to reduce or eliminate gas crossover. The use of porous, desiccant-loaded substrates offers important benefits over previous ERV membranes including that the desiccant-loaded substrate provides mechanical support, while simultaneously improving water transport and absorption. Further this type of substrate allows facile coating of the substrate with a very thin, highly permeable polymer layer that is well bonded to the substrate.

Coating

In the present approach the substrate is surface-coated on one side with a coating of water permeable polymer. The coating forms a very thin but continuous layer that acts as a selective barrier to air and contaminant gas transport, but allows the passage of water and water vapor. It can also act as a matrix to hold desirable additives such as flame retardants, additional desiccants, and microbicides.

The coating polymer is selected to have the ability to transport water condensate and water vapor. Water transport is driven by diffusion through the polymer by a concentration gradient from the wet side of the membrane to the dry side of the membrane. The thickness of the coating affects the rate of water transport through it, so that a thicker coating will tend to have a lower rate of water transport. Thus, it is desirable to reduce the coating thickness in order to increase the water transport rate without unduly compromising its ability to act as a barrier to gas mixing.

The final coating is preferably flexible to allow handling, pleating, and processing of the coated membrane to form ERV cores or other such devices.

Various coating polymers can be used including, for example, cellulose and its derivatives such as carboxymethyl cellulose, ethyl cellulose, cellulose acetate; polyethers such as polyethylene oxide, polyethylene glycol, polyphenyleneoxide; vinyl alcohols such as polyvinyl alcohol; and acrylics such as polyacrylates and polyacrylamides. However, some of these materials do not have sufficiently high water transport rates for ERV applications, and some are difficult to cross-link, or tend to result in brittle or fragile coatings, and some cannot readily be applied as an aqueous solution.

Non-ionic polymer coatings are used in the present membranes. Compared to ionomeric polymers, non-ionic polymers are less susceptible to being poisoned or altered by contaminants in the air and water streams of the end-use device. Ionomer coatings may be compromised during operation if exposed to acidic or basic environments, metal ions, salts or other contaminants. Furthermore, ionomer coating solutions must generally be maintained within a certain pH range, limiting the additives that can be included in the coating solutions.

Preferably the polymer coating can be applied as an aqueous solution to reduce health and environmental impacts often associated with other solvents. Water permeable polymers that have high water vapor transport rates (for example, polyethylene oxide (PEO), and polyvinyl alcohol (PVA), and cellulose) tend to also be soluble in liquid water. This means that they can be applied to the substrate as aqueous solutions but will tend to dissolve or leach off in the presence of liquid water. In the present approach the polymers are dried and are preferably cross-linked on the surface of the substrate, for example, during drying or in another post-coating step. This can render the thin polymer coating insoluble in water, and can increase operational lifetimes for the coated membrane material, and also allow washing of the material during the maintenance of the ERV core (which is not possible with most currently available membrane-based ERV cores).Thus, cross-linking agents can be used in aqueous polymer coating solutions to make the polymer insoluble once it is applied to the substrate. Cross-linked polyurethane-polyether copolymers are suitable flexible, durable water permeable coatings that can be applied as aqueous solutions. For example, non-ionic polyurethane-polyether polymers (such as, for example, available from Lubrizol under the name PERMAX 230) containing a polyurethane backbone 'hard' segment for mechanical strength and polyethylene oxide (PEO) 'soft' segment side chains for water permeability and water transport functionality have been found to be suitable. For these coatings the cross-linking will generally occur on carboxyl groups in the polyurethane segments of the polymer chain. The cross-linking renders the polymer coating less soluble in liquid water, while the water transport properties of the soft (PEO) sections of polymer are adequately retained. Suitable cross-linking agents include aziradines, melamines, isocyanates, carbodiimides, boric acid, and glutaraldehyde.

If the substrate is well-chosen, a polymer solution can be applied directly to the substrate by a blade or similar device. The thickness may be controlled by the blade pressure and solution viscosity, as well as the solids content in the coating solution. Other suitable application methods include dip-coating, Mayer rod, blade over roller coating, direct gravure, offset gravure, kiss coating, slot die and spray-coating. The wet, coated substrate is then typically passed through a dryer or oven to remove excess water and cause the coating to adhere to the substrate surface. Drying may be achieved, for example, through heated air drying by convection, by the use of infrared heaters, or a combination of the two. The elevated temperature in the dryer may initiate or expedite cross-linking of the polymer coating. Depending on the type of coating polymer, other cross-linking techniques may be used (for example, vacuum drying or exposure to UV). Production of these membranes based on coated silica-polyolefin substrates can be completed on roll-to-roll equipment in a continuous process, allowing for high volume, low cost manufacturing.

Preferably there is not significant penetration of the polymer solution into the pores or through the thickness of the substrate. The coating remains substantially at the surface forming a thin but substantially continuous dense film. In preferred embodiments, the thickness of the coating is in the range of about 0.1 to 25 micron, and is more preferably less than 5 micron. The coating loading is preferably in the range of about 0.1-15 $g/m^2$, and is more preferably in the range of about 0.5-5 $g/m^2$. The use of non-ionic polyurethane-polyether coatings offers important benefits over previously used materials, including that these polymers have high water permeation, and the coatings can be cross-linked (without significantly decreasing in water permeation) allowing the membrane to be rendered insoluble in the operating environment and washable. These coatings allow long operating lifetime with substantially reduced risk of poisoning, contamination, and performance degradation. In combination with the desiccant-loaded substrate, these coatings can be applied to make membranes with thin coatings that have high water permeation and high selectivity. The ion-ionic polyurethane-polyether polymer allows facile incorporation of additives with desirable functional properties to the coating mixture and into the membrane.

Additives

The properties of the coated membrane can be further enhanced for the particular end-use application by incorporating additives into the polymer coating. Examples include:

(a) improved flame resistance through the use of flame retardants; and/or (b) improved microbial resistance through the use of microbicides to resist the growth of mould, bacteria and/or fungus; and/or (c) increased water absorption and permeation through the use of desiccants and/or other polymers.

Flame retardant additives can be added to the coating to improve the flame resistance of the final membrane. This is particularly important if the substrate is not itself flame resistant, in which case, the coating can contain sufficient additive to make the final membrane flame resistant. Even if the substrate is flame resistant (as is generally the case with the desiccant-loaded polymer films described herein, particularly if the desiccant loading is high), additives can be added to the coating to improve the flame resistance of the final membrane. Various types of additives are suitable for this purpose. These include intumescents such as expandable graphite and phosphonates; aluminum trihydrates; metal hydroxides, such as aluminum hydroxides and magnesium hydroxides; antimony compounds such as antimony trioxide, antimony pentoxide and sodium antimonite; boron compounds, such as boric acid, borax, zinc borate; other metal compounds, such as molybdenum compounds, titanium compounds, zirconium compounds, zinc compounds such as zinc stannate, zinc hydroxy-stannate; phosphorus compounds such as red phosphorus and ammonium polyphosphate; melamine; and guanidine. Ideally the flame retardant additive is not soluble in the coating solution, and can be easily dispersed in solution. Also it is desirable for the additive to be non-toxic, and effective at low loadings. Some products, such as those from FlameStop Inc. have the added benefit of containing inhibitors to mould and bacterial growth. Flame resistant additives may also be incorporated into the pores of the substrate.

The substrates and coatings used in preferred embodiments of the membranes described herein generally do not promote, and in some cases resist, growth of mould and bacteria (unlike cellulose and other previously used substrates and coatings). The addition of microbicides to the coating can further deter the growth of mould, fungus, and bacteria in an enthalpy exchanger or other device. For enthalpy exchangers which are part of an air handling system the materials are being used in a dark, humid, and warm environment, which is favourable to mould and bacterial growth. The addition of these additives can be beneficial even if the membrane materials utilized are not capable of being degraded. Suitable additives for this purpose include Microban®, Bioban (bronopol), Dowicide (2-phenylphenol), Filmguard (3-iodopropynylbutylcarbamate), Amical (diiodomethyl-p-tolylsulfone), and Canguard (1,2-benzisothiazolin-3-one).

Even though the substrate comprises a desiccant, in some cases it may be desirable to add additional desiccants to the coating to increase the water permeation of the material. Preferably the desiccants added to the coating are selected and used in quantities such that they do not adversely increase gas permeation through the membrane and do not dissolve in water over time. Suitable desiccants may include lithium chloride, silica, molecular sieves, alumina, calcium chloride, and calcium sulphate, although some of these will tend to be water soluble.

Water-soluble polymers can be added to the coating as viscosity-modifying and film forming agents to improve to consistency of the coating and increase ease of manufacture. Surfactants can be added to the coating to improve the spreading of the coating on the substrate or decrease foaming in the coating solution during processing.

Figure 5:
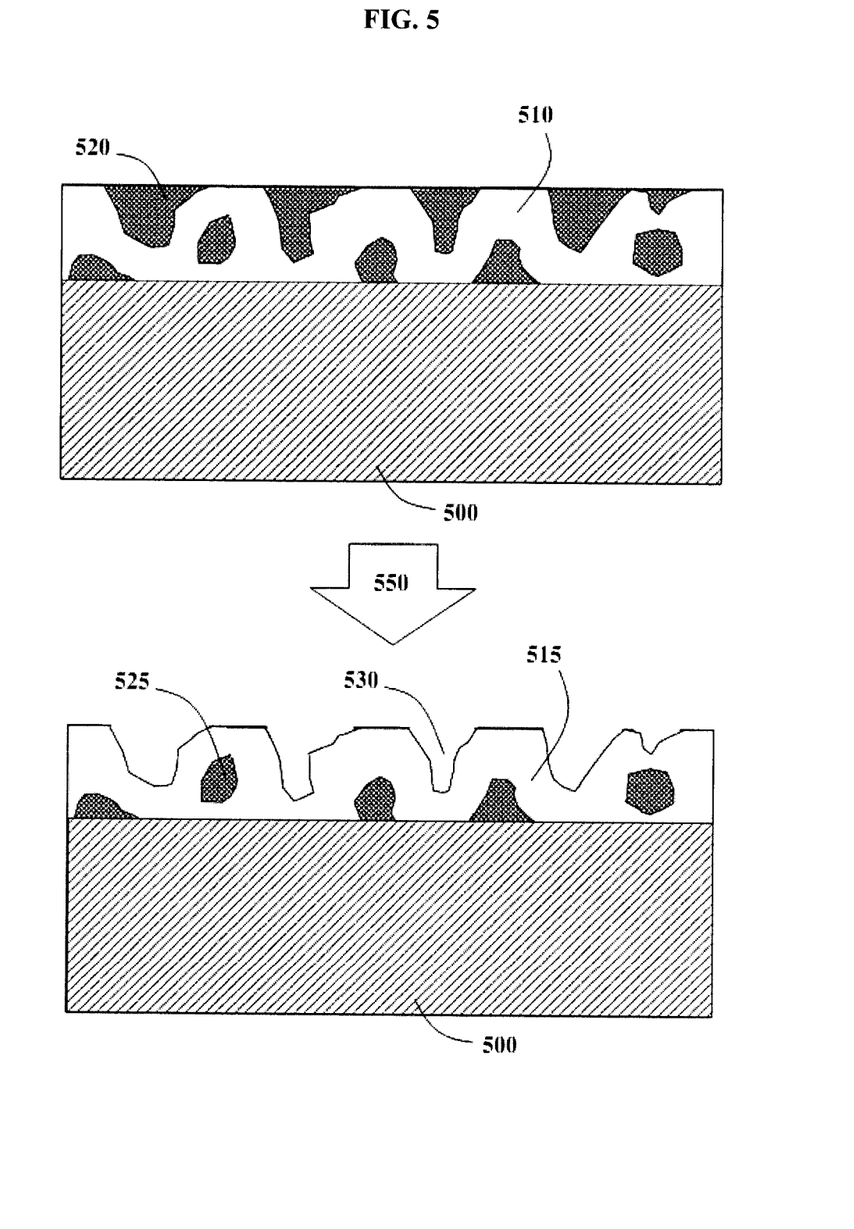
FIG. 5 is a simplified diagram of a coated membrane where a water-soluble and a cross-linked polymer are incorporated into the coating, and illustrates the possible effect on the structure of the coating of extraction of some or all of the water-soluble polymer from the coating.

Polymers which are soluble in water and the coating solution, and which will not be cross-linked, can be added to the coating solution and then be extracted from the coating after the substrate is coated and dried. This may leave pores in the coating such that the coating can still block air and contaminant crossover, but may be less dense and thus have higher water permeation. For example FIG. 5 shows simplified illustration of an exaggerated surface coating on a substrate 500, coated with a solution of a cross-linkable polymer and a water-soluble polymer. After manufacture, the coating comprises a mixture of cross-linked polymer coating 510 and a water-soluble polymer 520. After an extraction step with water 550, additional surface pores 530 may result and the surface area of the coating may be increased. Some water-soluble polymer may remain trapped in the coating 525. The cross-linked water permeable polymer coating 515 is ideally still intact and capable of blocking gas and contaminant transport. However with the extracted polymer removed, the average coating thickness and water permeation of the membrane may be higher than for the membrane with the mixed coating, or for a membrane with a cross-linked water-permeable polymer coating (without incorporation of a water-soluble polymer). Pore formation in the coating may also be achieved by adding solvents to the solution and extracting during drying, adding and extracting salts, or other fillers which can be extracted.

In one aspect, the present invention relates to ERV cores and ERV systems incorporating water transport membranes of the type described herein. The ERV can be a conventional plate-type ERV or an ERV with a pleated membrane core or an enthalpy wheel. Some examples of such devices are described in U.S. patent application Ser. No. 11/905,190 (published as US2008/0085437) and in U.S. patent application Ser. No. 12/318,973 (published as US2009/0193974) both of which are hereby incorporated by reference in their entirety.

Figure 2:
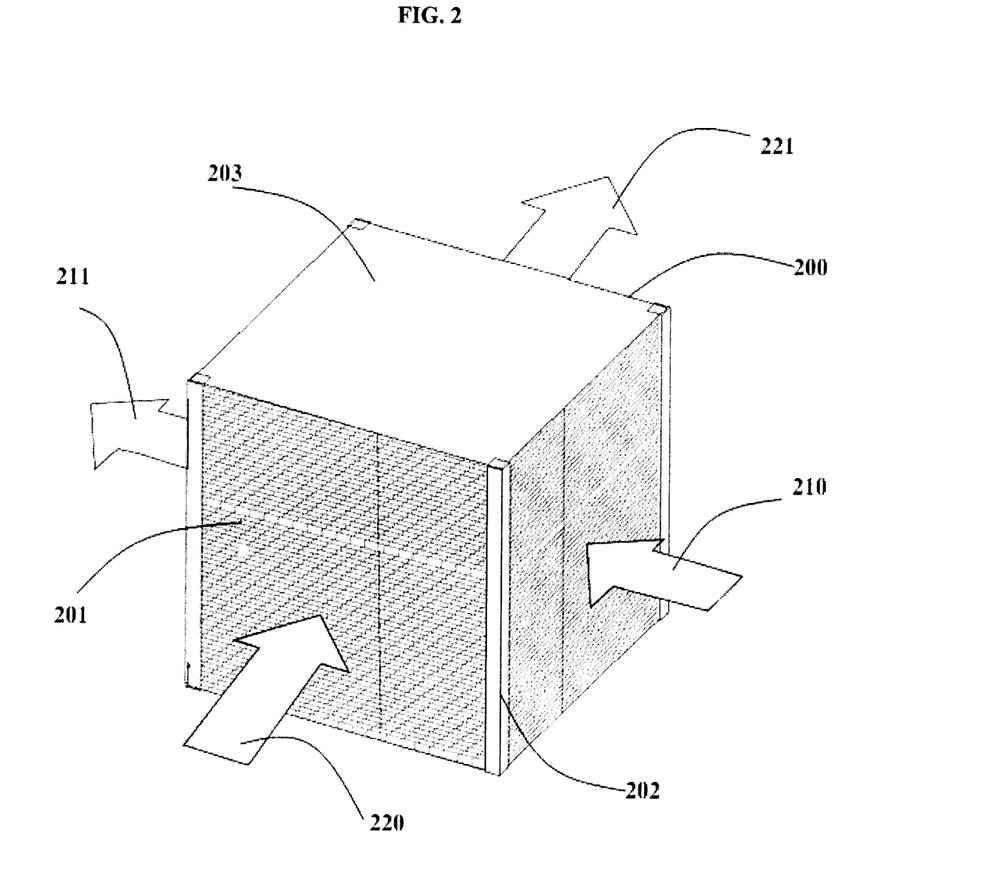
FIG. 2 is a simplified isometric view of a cross-flow ERV core.

FIG. 2 is a simplified isometric view of embodiment of an ERV core 200 comprising a pleated membrane which comprises alternating layers of membrane 201 with gas flow pathways in between adjacent layers. The flow pathways can comprise channels that run through the core over the surface of the membrane and are sealed such that there is flow of gases through the core from one face to the other without mixing of the two streams through the membrane. The gas streams are directed through ERV core 200 such that one side of each membrane layer is exposed to one gas stream 210 and the opposing side of the membrane layer is exposed to the other gas stream 220. In the illustrated embodiment the gases are in a cross-flow configuration. Counterflow, co-flow, and other relative flow configurations can be used depending on the geometry of the ERV core and the manifolding. Transport of heat and moisture occurs through the membrane due to the differential of heat of moisture between the two gas streams. The flow of heat and moisture may occur in either direction through the membrane, depending on the conditions of the gas streams 220 and 210. When stream 210 is cool and dry and stream 220 is warm and moist, heat and humidity transport will occur through the membrane to heat and humidify flow 210 before it exits the core at 221. The warm and moist flow 220 will thus be cooled and dehumidified as it passes through the core and exits at 221. At the same time, the cool and dry stream 210 is warmed and humidified as it passes through the core and exits at 211.

The perimeter of the pleated membrane cartridge is sealed to prevent gases from leaking between the perimeter of the pleated cartridge and the interior of the ERV housing (not shown in FIG. 2). For example, gaskets or seals 202 and 203 can be disposed along the edges of the pleated membrane cartridge and top and bottom surface so that once in the ERV system a seal will be created between the inlet and outlet ports to prevent short-circuiting of the gases between the streams.

Figure 3:
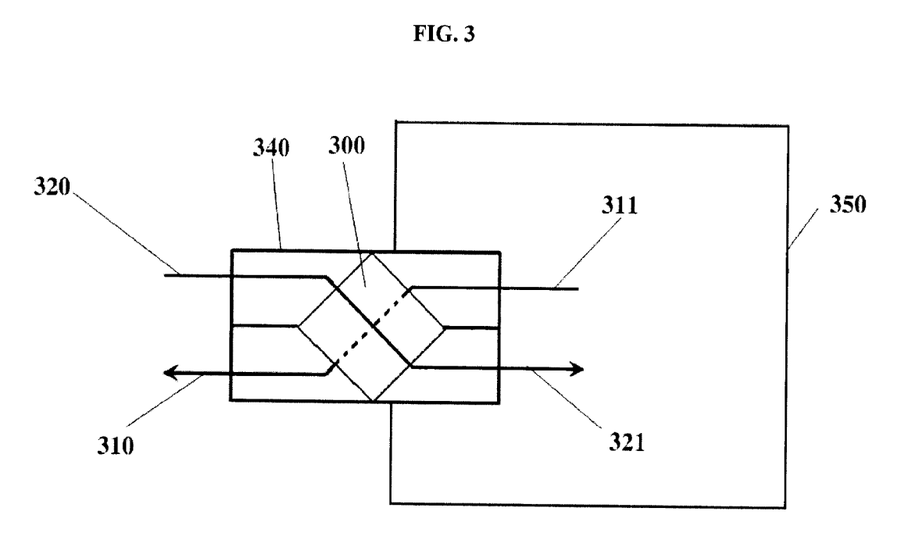
FIG. 3 is a simplified diagram illustrating use of an ERV system.

FIG. 3 is a simplified view of an ERV core 300 in an ERV system 340. System 340 can contain fans and controls to move the air through the system in the directions indicated by the arrows in FIG. 3. Seals are created around the periphery of the core. The ERV system interfaces between air in an enclosed building space 350, and the exterior environment. The seals allow air streams to be directed through ERV core 300 in such a way that incoming air 320 entering building 350 passes on one side of the membrane layers in the core 300 and outgoing air 310 exiting the building passes on the other side of the membrane layers in the core. If the outgoing air 311 is cool and dry and the incoming air 320 is warm and moist, heat and moisture transport will occur through the membrane in the core such that the exhaust air at 310 will have gained heat and moisture, and air entering the enclosure at 321 will have been cooled and dehumidified.

Figure 4A:
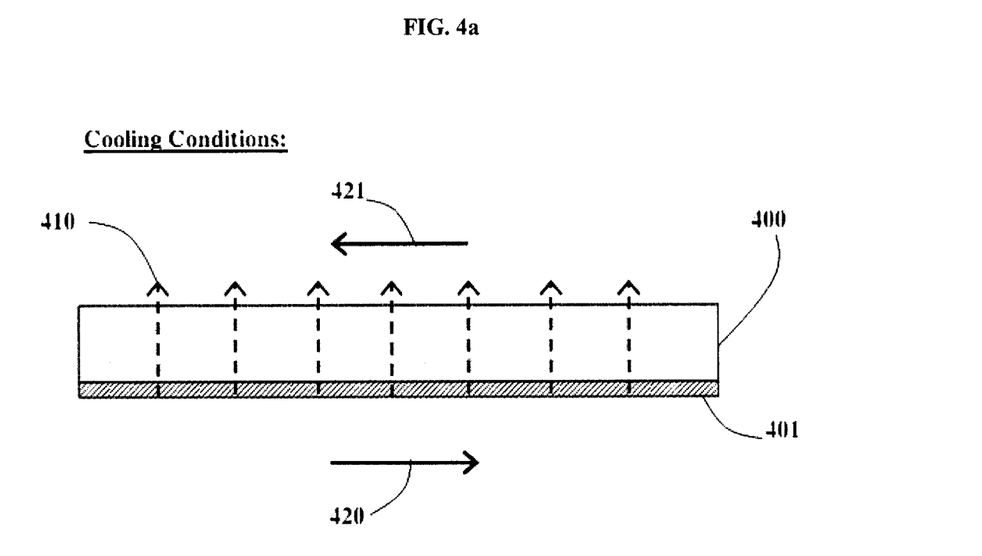
FIGS. 4a, 4b and 4c are simplified diagrams (not to scale) illustrating how an anisotropic coated membrane could be oriented in an enthalpy exchanger.
Figure 4B:
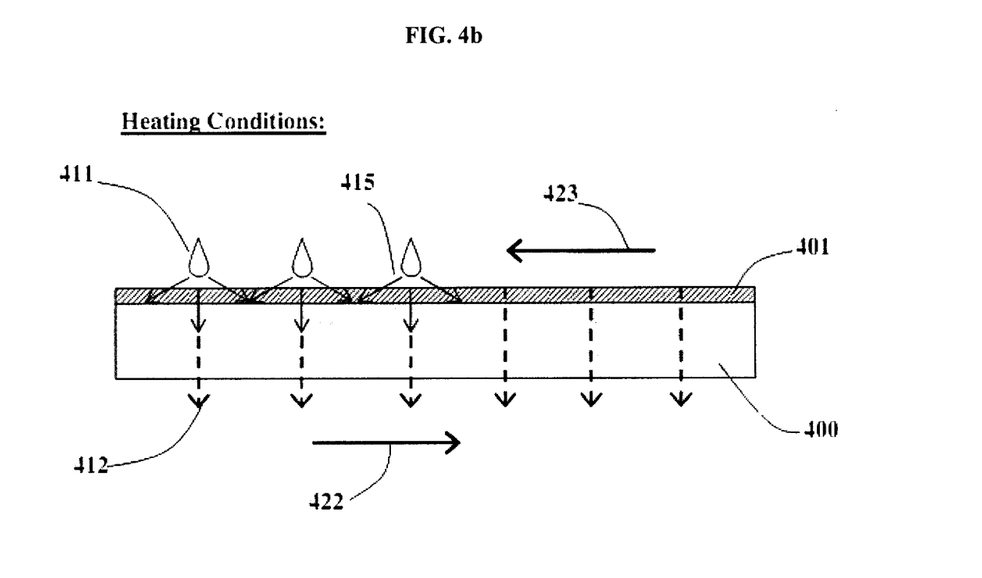
Figure 4C:
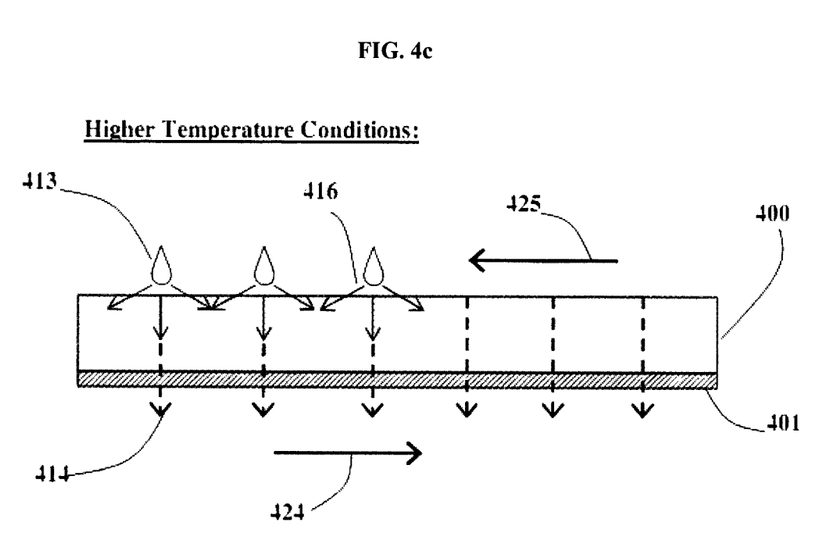

Due to the nature of some water permeable polymers, the water permeation of the coating is expected to increase when the coating is exposed to higher humidity. Some water permeable polymers may also show decreased water permeation when exposed to higher temperatures. Since the present membranes are anisotropic (because they are coated only on one side) there may be a preferred orientation for the membrane in certain applications. For example, as shown in FIG. 4a, in ERV applications when the ambient air is warm and humid (summer months in North America) it may be desirable for the coating 401 to be on the humid side of the membrane, i.e. exposed to the incoming moist air 420. Since the coating 401 will generally transport more water in higher humidity conditions, having the coating 401 in direct contact with the water vapor in the air stream 420 may lead to higher performance in the summer months. Once the water 410 passes through the coating 401 it will diffuse through the open porous substrate 400 into the cool exhaust stream 421 on the other side of the membrane. When the ambient outside air is cool and dry 422, as shown in FIG. 4b, there will tend to be condensation 411 in the exhaust air stream 423 as it passes through the enthalpy exchanger. This may occur due to the rapid cooling of the warm, humid air being exhausted from the building. If the coated side of the membrane is exposed to the exhaust stream then the coating may become saturated with water condensate 415. This may increase the water permeation of the coated membrane. The anisotropic nature of the membrane may lead to a higher performance in summer and winter conditions depending on the flow orientation. In some higher temperature, condensing conditions, as shown in FIG. 4c, the membrane may be exposed to a high humidity, high temperature stream 425 and a similarly high temperature but dry stream on the opposing side of the membrane 424. Condensation will generally tend to occur in the enthalpy exchanger on the high humidity side 413. In these conditions it may be beneficial to expose the substrate surface of the membrane 400 to the condensing stream allowing the desiccant-loaded substrate to help absorb this excess liquid water 416 and distribute it through the membrane to the thin polymer coating 401 on the other side. The foregoing description is not intended to be limiting with respect to how the membrane should be oriented. The preferred orientation (if any) of the anisotropic membrane in a particular device will depend on the end-use application and on the specific conditions to which it is exposed.

EXPERIMENTAL EXAMPLES

Membrane Testing

Examples 2-5 and 8-12 describe the preparation of various embodiments of coated membranes that comprise a desiccant-loaded polymer substrate with a water permeable polymer coating on one surface thereof. These examples, along with Example 13, also illustrate some of the properties and results that can be obtained with such membranes. The experiments described in Examples 2-5, and 8-13 were intended to explore the effect that the nature of the porous substrate, the coating and optional additives can have on the properties of the final membrane. The preparation and testing of other types of membranes are also described for comparison purposes (see Examples 1, 6-7).

Example 1

An Uncoated Substrate

A silica-filled polyethylene sheet material was obtained from Daramic. The material is sold commercially as a flat sheet battery separator, and is a microporous material consisting of silica-filled polyethylene. The material had a silica-to-polyethylene ratio of 2.6 to 1, or about 72% silica by weight, a thickness of 178 micron, a porosity of 58%, and an average pore size of about 0.2 micron. The substrate material was tested for water permeation, air permeation, exhaust air transport ratio (EATR), and flame resistance, using techniques described below. The results obtained for the uncoated substrate are shown in Table 1 below. The uncoated substrate had a desirable water flux of 24.3+/−1.2 kg/m$^2$/day, However, the air crossover rate was too high for most ERV applications and the Exhaust Air Transport Ratio (EATR) and burn rate were not suitable for most ERV applications. The EATR provides an indication of the amount of contaminant gas that may pass through the material from one stream to the other; it would be desirable for this value to be less than 5%, and more desirable for it to be less than 1%. Optimally there is 0% contaminant gas transport through the material. The burn rate is too rapid for the material to pass a flammability test such as those indicated by UL-94 HB or other certification tests.

Example 2

A PVA-Coated Substrate

Water and polyvinyl alcohol (PVA) polymer (85000-124000 MW from Sigma Aldrich) were heated and mixed to form a 4% solution by weight. A 4% aqueous solution of boric acid was added to the polymer solution in a ratio of 1:4 by weight in order to cross-link the PVA polymer. A thin coating of the aqueous PVA/boric acid solution was applied to one surface of the same substrate material used in Example 1 using a Mayer rod coater. The coating loading of the PVA was 3.6 g/m$^2$. The PVA-coated substrate was tested for water permeation and air permeation, in substantially the same way as in Example 1. The results for this PVA-coated substrate are also shown in Table 1 below. The air crossover was reduced to 10 cm$^3$/min but the water flux was found to be 8.8 kg/m$^2$/day which is much lower than for the uncoated substrate in Example 1, and probably too low for high performance ERV applications. The coated substrate was rather brittle and difficult to pleat, handle, and roll. The results indicate that PVA is not a preferred polymer for the coating.

Example 3

A Polyurethane-Polyether Coated Substrate

A polyurethane-polyether (PU/PE) copolymer mixture, manufactured under the name PERMAX 230, was obtained from Lubrizol. The polymer is supplied in an aqueous solution with 33% solids. The solution was further diluted with distilled water to 16.5% solids. This solution was coated on the substrate using a 0.08 mm diameter wire wound Mayer rod coater on one surface of the same substrate material used in Examples 1 and 2. The material was then dried to produce a thin surface coating of water permeable polyurethane-polyether. The coating loading was 3.0 g/m$^2$. The polyurethane-polyether-coated substrate was tested for water permeation and air permeation, in substantially the same way as in Example 1. The results for this coated substrate are also shown in Table 1 below. The air permeation and EATR were significantly reduced in comparison to the uncoated substrate of Example 1, and the material had a favorably high water transport rate compared to the uncoated material of Example 1. The coated substrate was easy to handle, pleat, and roll. When the membrane was heated in water at about 80° C. for one hour, however, the coating was removed from the membrane surface indicating that the coating should preferably be cross-linked to render it less water soluble.

TABLE 1

| Test | Uncoated Substrate (Example 1) | PVA-coated Substrate (Example 2) | PU/PE-coated Substrate (without cross-linking) (Example 3) |
|---|---|---|---|
| Water Flux | 24.3 kg/m$^2$/day | 8.8 kg/m$^2$/day | 18.9 kg/m$^2$/day |
| Air Crossover | 800 cm$^3$/min | 10 cm$^3$/min | 5 cm$^3$/min |
| EATR (O$_2$) | 45% | not measured | 0.5% |
| Burn Rate | 0.76 cm/s | not measured | 0.76 cm/s |

Example 4

A Polyurethane-Polyether Coated Substrate with Cross-linking

Aqueous solutions of polyurethane-polyether polymer (based on Lubrizol PERMAX 230) were prepared with a polycarbodiimide cross-linking agent (obtained from Picassian Polymers under the name XL-702) in various weight ratios of polymer to cross-linking agent. These solutions were used to coat weighed samples of the same Daramic substrate material used in Examples 1-3. Another weighed sample of the same substrate material was coated with polyurethane-polyether without a cross-linking agent. The coatings were applied using a Mayer rod coater.

The membranes were dried at 100° C. and re-weighed and the coating loadings are reported in Table 2. The membranes were then placed in water at about 80° C. for 1 hour, and then dried and weighed again. The percentage coating loss was determined and is shown for each sample in Table 2 below. The results indicate that the use of a cross-linking agent to cross-link the coating makes the coating less soluble in water, without significantly affecting the water flux of the membrane. This is expected to give the coated membrane longer operational lifetime and maintain low crossover over time.

TABLE 2

| Cross-linking agent wt % | Coating loading g/m$^2$ | Coating loss % |
|---|---|---|
| 0 | 5.5 | 100 |
| 3 | 5.5 | 45 |
| 7 | 4.0 | 36 |
| 10 | 5.0 | 0 |

Example 5

Effect of Coating Loading

Figure 6:
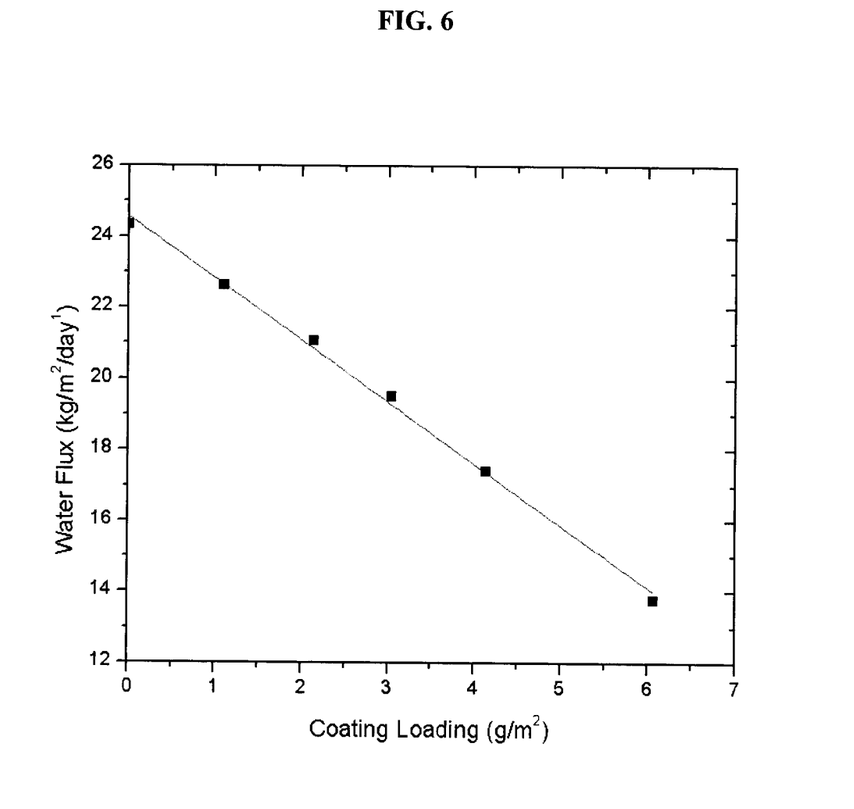
FIG. 6 shows the measured water flux of various coated membrane samples as a function of coating loading.

Membranes with different coating loadings were prepared by coating samples of the same Daramic substrate material used in Examples 1-4 with aqueous solutions of the same polyurethane-polyether mixture (based on Lubrizol PERMAX 230) with polymer concentrations between 16 to 33% by weight, and a polycarbodiimide crosslinking agent from Picassian Polymers (XL-702). The polymer to cross-linking agent ratio was held constant on a weight basis of 10 parts polymer to 1 part cross-linking agent. The solutions were coated on one surface of the substrate using a Mayer rod coater wound with wire varying from 0.05 to 0.3 mm in diameter. The water permeation of the resulting coated membrane samples was tested and the results are shown in FIG. 6. They demonstrate a clear linear trend towards higher water flux at lower coating loadings. It is thus important to reduce or minimize the thickness or weight of the coating layer in order to increase water flux in the membrane. However there will be a lower limit: below a certain coating loading (which will vary depending on the particular substrate, coating and other factors) the selectivity of the membrane will be compromised and the contaminant crossover will increase. Membranes in this example with low coating loadings of about 1.1 g/m$^2$ had zero air crossover and EATR, and had water flux rates of about 23 kg/m$^2$/day, which is only 4-8% lower than the uncoated substrates. Decreasing the coating thickness further will increase the water flux, but the contaminant crossover.

Example 6

Effect of Substrate Thickness and Porosity

In order to study the effect of substrate thickness and porosity, a range of materials was obtained from PPG under the name Teslin®. These materials vary from 145 to 356 micron. The material density was compared to air crossover and water transport, as shown in Table 3. Decreasing the material density increases the crossover and water transport rates; this occurs since there will be less resistance to water transport in the thinner more porous materials. This demonstrates that thinner and less dense (or higher porosity) substrates tend to have better performance and that thin, high porosity substrates are therefore generally preferred. A custom-ordered a thinner substrate with higher porosity was obtained from PPG. This material was of a similar composition to the other Teslin® materials tested, but had a thickness of 104 micron. It had a much improved water flux rate, as shown in Table 3. Further details on the production and testing of a coated selective membrane with this substrate can be found in Example 8.

TABLE 3

| Thickness (μm) | Basis Weight (g/m$^2$) | Density (kg/m$^3$) | Air Crossover (cm$^3$/min) | Water Flux (kg/m$^2$/day) |
|---|---|---|---|---|
| 104 | 49 | 470 | 1420 | 33.8 |
| 145 | 90 | 621 | 500 | 17.3 |
| 178 | 115 | 646 | 220 | 13.9 |
| 203 | 134 | 660 | 187 | 12.7 |
| 305 | 206 | 675 | 143 | 10.4 |
| 356 | 243 | 683 | 121 | 6.4 |

Example 7

Substrate with Large Pores and No Desiccant Loading

A non-woven polymer sheet material was obtained from Crane and Co. sold under the name CU404. This material is a calendared polyethylene terephthalate (PET) nonwoven material with high porosity and large pore size, with a Gurley flow rate of 21 s/100 cm$^3$. The material is 101 micron in thickness. A coating solution containing 30% polyurethane-polyether (PERMAX 230) by weight with 3% cross-linking agent (XL-702) by weight was applied to one surface of the nonwoven substrate, filling the pores of the material. After the initial coat, the air crossover was still large, so a second coating was applied to the same surface. The double-coated and dried material had a measured air crossover rate and EATR of zero, however the water flux was found to be only 3.4 kg/m$^2$/day. It appears that when coating this non-woven, high porosity polymer material the coating did not remain as a surface layer, but resulted in a highly or fully filled or impregnated material with low water flux. This indicates that there is a pore size limit above which the coating will not be retained as a thin surface layer.

Example 8

A Higher Porosity, Low Pore Size, Thin Substrate with Desiccant Loading

A custom-ordered, silica-loaded substrate with higher porosity, low pore size, and reduced thickness was obtained from PPG. The material had a thickness of 104 micron (see Example 6). The uncoated substrate had an air crossover rate of 1420 cm$^3$/min and the water flux was found to be 33.8 kg/m$^2$/day. The substrate was coated with polyurethane-polyether (PERMAX 230) at 15% by weight polymer in solution with Picassian XL-702 cross-linking agent at 1.5% weight in solution. The coating was applied with a Mayer Rod coater, and the dry coating loading was found to be 2.0 g/m$^2$. The air crossover of the coated substrate was zero, the EATR was zero. The water flux of the membrane was found to be 28 kg/m$^2$/day, which was considerably greater, by about 20%, than the materials tested in Example 5 in which a thicker, less porous substrate was used. Thinner substrates with higher porosity containing desiccant additives allow the preparation of membranes with low coating loadings, and that have low gas and contaminant crossover rates and high water flux.

Example 9

A Coated Substrate with Antimicrobials

Solutions of 16% by weight polyurethane-polyether polymer (PERMAX 230), 1.6% cross-linking agent by weight (XL-702), and antimicrobial additive (Microban AF) were prepared. The quantity of antimicrobial ranged from 0.25 to 5% by weight in solution and 1 to 20% by weight in the dried coating. The coatings were applied on the surface of a silica-polyolefin substrate from PPG, with a substrate thickness of 150 micron. The samples were tested for resistance to *Aspergillus niger* fungi in an AATCC 30 test and for resistance to *Staphylococcus aureus* and *Klebsiella pneumoniae* in a Kirby-Bauer test. All samples demonstrated zone inhibition of the microbes. A sample of the coated material at 2.5% antimicrobial weight percentage in the coating was washed for 2 hours in water at 60° C. The sample was then tested for resistance to *Aspergillus niger* fungi in an AATCC 30 test. The sample demonstrated a growth free zone of greater than 4 mm and 100% surface inhibition of the fungi, which indicates that the membrane is effective at preventing fungal and mould growth on or near the membrane.

Example 10

A Polyurethane-Polyether Coated Substrate with Flame Retardant

A solution of polyurethane-polyether was prepared and mixed with a flame retardant in various percentages, with the remainder of each solution being distilled water. The polymer solution was obtained from Lubrizol and the flame retardant additive was FRX Powder obtained from Fire Stop Inc. These mixtures were used to coat the same substrate material used in Examples 1-4 using a blade coater, which was similar to the Mayer rod coaters used in the other examples, but was more appropriate for coating solutions with high amounts of solids in solution. The results are presented in Table 4 below.

TABLE 4

| % Polymer in solution | % Flame retardant in solution | Coating loading g/m² | Water Flux kg/m²/day | Air Cross-over cm³/min | EATR % | Burn Rate cm/s |
|---|---|---|---|---|---|---|
| 25.0 | 40.0 | 6.2 | 17.9 | 25 | 2.0 | 0.28 |
| 20.0 | 40.0 | 6.7 | 21.1 | 325 | 16.4 | 0.05 |
| 50.0 | 40.0 | 11.2 | 12.4 | 0 | 0 | 0.18 |
| 25.0 | 20.0 | 2.1 | 20.3 | 320 | 14.7 | 0.51 |
| 50.0 | 20.0 | 4.0 | 15.4 | 0 | 0.5 | 0.41 |
| 37.5 | 30.0 | 4.8 | 16.6 | 5 | 0.5 | 0.41 |
| 20.0 | 35.0 | 4.5 | 22.6 | 700 | 24 | 0.15 |
| 25.0 | 35.0 | 6.6 | 19.8 | 30 | 1.5 | 0.20 |
| 50.0 | 0 | 3.0 | 18.9 | 5 | 0.5 | 0.76 |

The burn rate of the coated substrate without flame retardant as shown at the bottom of TABLE 4 was 0.76 cm/s; adding flame retardant to the coating significantly decreases the burn rate as shown in TABLE 4. As well as affecting the burn rate, the flame retardant has a significant effect on the water flux of the membrane. With 40% flame retardant low burn rates were achieved, but if the quantity of polymer was low (e.g. 20%) the air crossover rate and EATR were high. At 50% polymer the coating loading was higher (11.2 g/m²) and the water flux dropped to 12.4 kg/m²/day presumably because of the thickness of the coating.

It was concluded that with these additives there are preferred coating mixture ratios for given substrates at which low flammability requirements can be met, while maintaining a low gas crossover rate and contaminant transfer ratio, without unduly decreasing water transport performance.

Example 11

Other Additives: Silica

Microparticulate silica gel desiccant, Syloid AL-1 from Grace Davison with an average particle size of 7 micron was added to a polyurethane-polyether (PERMAX 230) aqueous solution. The solution contained 30% polyurethane-polyether polymer and 3% cross-linking agent by weight, and 3% silica particles by weight. The silica desiccant was added to the coating solution in an effort to further increase the water absorption and permeation properties of the coating. The solution was coated on the surface of a microporous silica-filled polymer substrate similar to those used in Examples 1-5 above. However due to the large particle size of the silica in the coating, a higher coating loading had to be applied to the substrate in order to sufficiently block gas permeation. At a coating loading of 7.5 g/m², the air crossover rate was zero, and the water flux was 17.9 kg/m²/day. A sample with a similar coating loading of 6.7 g/m² but without the silica additive had an air crossover rate of zero, but a somewhat lower water flux of 15.6 kg/m²/day. Thus, on a relative coating loading basis, the coating comprising a silica gel desiccant additive had a higher water vapor transport. However, due to the high coating loading necessary in order to create a selective membrane, the performance was lower than other selective membranes created. For example, membranes with a lower coating loading (1 g/m²) in Example 5 had higher performance at about 23 kg/m²/day. This was likely due to the large particle size of the silica additive. Smaller particle silica additives are likely to further improve the coating and the water transport performance of the membrane material.

Example 12

Other Additives: Polymers

A sample of silica-polyethylene material was obtained from PPG with a thickness of 104 micron. The uncoated sample was tested for water transport and had a water flux rate of 33.8 kg/m²/day, the air crossover rate was 1420 cm³/min, and the EATR was greater than 50%. A solution of polyurethane-polyether (PERMAX 230) at 15% weight was mixed with 3% weight cross-linking agent (XL-702) and 3% by weight polyvinylpyrrolidone (PVP), Luviskol K90. The substrate was coated with a Mayer rod coater. The dried coating loading was 2.3 g/m², the air crossover rate was zero, the EATR was zero, and the water flux was 28.6 kg/m²/day. The membrane was then soaked in a water bath at 50° C. to extract at least some of the water-soluble PVP polymer. The extracted membrane was dried and the coating weight was found to be 1.0 g/m², the crossover was still zero, the EATR was still zero, and the water flux of the extracted membrane was 31.3 kg/m²/day. This demonstrates that incorporating a water-soluble and non-cross-linked polymer into the coating and then extracting it from the coating can enhance water transport of the coated membrane. It appears that using this technique (adding a water-soluble polymer to a coating solution with a cross-linkable polymer and cross-linking agent, coating and drying the membrane, and then extracting the water-soluble polymer from the coating) perhaps introduces some porosity into the coating, decreases its density and average thickness and/or increases its higher surface area, and that this may improve the water transport of the membrane coating without adversely increasing the air and contaminant crossover.

Example 13

Directionality

In certain conditions there may be a benefit in having the coated or uncoated surface of the membrane facing either the dryer or the wetter gas stream. A coated desiccant-loaded substrate from Example 5, with 2.9 g/m² coating loading was utilized in these tests. One surface of the membrane had a coating, and the other surface had the desiccant-loaded substrate exposed. Tests were completed under different sets of conditions listed in Table 5, with the coated surface facing the wet stream and then with coated surface facing the dry stream. The results are shown in Table 6.

TABLE 5

| Condition | Dry Stream Temperature (° C.) | Dry Stream Relative Humidity (%) | Wet Stream Temperature (° C.) | Wet Stream Relative Humidity (%) |
|---|---|---|---|---|
| A | 50 | 0 | 50 | 45 |
| B | 50 | 0 | 65 | 100 |
| C | −10 | 0 | 35 | 60 |

TABLE 6

| Condition | Direction | Water Flux (kg/m$^2$/day) |
|---|---|---|
| A | Coating Wet | 19.8 |
| A | Coating Dry | 18.3 |
| B | Coating Wet | 116.7 |
| B | Coating Dry | 161.1 |
| C | Coating Wet | 37.9 |
| C | Coating Dry | 34.2 |

Under condition A (where the wet stream is at low humidity with only water vapor present) the water flux was 7.5% higher when the coating was facing the wet side. At operating condition B, when the temperature and humidity levels of the wet stream are higher, there will be a significant amount of water condensing from the wet gas stream and striking the membrane. Under operating condition B, the membrane showed a 38% increase in transport when the coating was on the dry side (desiccant-loaded substrate on the wet side). This indicates that under certain conditions it is beneficial to have the uncoated surface of the membrane facing the wet stream. Finally in operating condition C, the membrane was exposed to dry, cold air (−10° C.) on one surface and warm humid air on the other surface of the membrane. Some water will condense in the wet stream as the air is cooled. Under these conditions, the membrane performed almost 10% better when the coated surface of the membrane was facing the wet side. Here the water permeable polymer coating might not transport water as well when exposed to the dry gas stream when below freezing temperatures. Also the amount of condensing water may not be significant enough to demonstrate the benefits observed during operating condition B. The asymmetry of the membrane, and which way it is best oriented, can be important consideration depending on the operating conditions to which the membrane will be exposed.

Summary of Test Methods Used in the Examples

A dynamic water vapor transport testing procedure was developed which was designed to test the membranes under conditions which are similar to those in which they might be utilized. A sample of membrane material was sealed in a test apparatus with flow field pathways on both sides of the membrane to evenly distribute gases over the both surfaces of the material, the gases being separated by the membrane. The flow rate, temperature, and relative humidity of each inlet gas stream could be controlled, and the outlet temperatures and relative humidity of each gas stream could be measured. The gases were supplied and directed in counter-flow over the opposing surfaces of the membrane. The membrane active area in the test jig was 33 cm$^2$. In a typical test, a first gas stream was supplied at 24° C. and 0% relative humidity to the inlet on one side on the membrane. A second gas stream was supplied to the inlet on the other side of the membrane at 35° C. and 50% relative humidity, and at the same flow rate as the first gas. The water content and temperature of the two streams were measured and recorded at the outlets. From these values, the water transport rate of the test sample was determined, in units of mass per time (g/h). The results may also be reported as a water flux by dividing by the membrane area over which the transport has occurred in units of mass per area per time (g/m$^2$/h). By dividing the water flux by the calculated mean water vapor pressure differential within the test module, a water permeation value can be determined in units of mass per area per time per vapor pressure differential (g/m$^2$/h/kPa). Due to the scale of the results it was found to be most convenient to report water transport data as a water flux value in units of kg/m$^2$/day.

To assess the air permeation or air crossover properties of the membrane materials in the above examples, samples of the membrane material were sealed in a test apparatus. Pressurized air was applied to one side of the membrane and the air flow through the material was recorded. In a typical test, the pressurized air was applied at 3 PSI or 20.7 kPa. The crossover flow rate through the test sample was recorded in cubic centimeters per minute (cm$^3$/min). This value can be converted to an air permeation value by dividing by the applied pressure and the membrane area (33 cm$^2$ in a typical test). Air permeation can be reported in cm$^3$/min/cm$^2$/kPa.

The exhaust air transfer ratio (EATR) provides an indication of the amount of contaminant gas that may pass through the membrane material. A test was developed to determine the EATR of the membrane. In this test, again a membrane sample was placed in a test apparatus which separates the two sides of the membrane, so that independent gas streams may be provided on opposing sides of the membrane. On one side of the membrane a substantially pure nitrogen stream was passed over the surface of the membrane. On the other side of the membrane an air stream was passed over the membrane surface. The differential pressure between the two streams was maintained at zero so that only diffusive transport and not convective transport occurs through the membrane. An oxygen sensor was placed at the outlet of the nitrogen stream to measure the oxygen concentration. Since the concentration of oxygen in air is known, and the nitrogen stream contained substantially no oxygen at the inlet, the percentage of oxygen passing through the membrane by diffusion can be reported as:

$$EATR\% = \{[C(O_2, 1)]/[C(O_2, 2)]\} \times 100$$

where C refers to the percent concentration of oxygen (O$_2$) at points 1 and 2, with point 1 being at the nitrogen-side outlet (measured by the sensor), and point 2 being at the air-side inlet (known, 20.95%).

The flame test used was based on UL-94 HB horizontal burn test standard from Underwriters Laboratories which is designed to determine the flammability of a material. A sample of membrane was cut to 1.25×12.5 cm. The sample was supported horizontally and then tilted lengthwise at a 45° angle from horizontal. A propane flame approximately one centimeter in height was applied to the lower short edge of the titled membrane sample. The flame was held to the sample until the flame spread past 2.5 cm of the material. After the 2.5 cm burned the flame was removed and the flame was allowed to propagate across the material. The burn time and burn distance were recorded and the burn rate was determined in cm/s. If the material self extinguished before the 10 cm mark and the material has a burn rate of less than 0.125 cm/s then the material passes the HB test.

In order to accurately and consistently coat membranes on a bench-scale, a Mayer rod coater was used. This type of coating device may also be referred to as Meyer bar, miter rod, Meyer rod, meter bar, coating rod, equalizer bar, doctor rod, or metering rod coater. In these types of bars, steel wire is wound tightly around a rod. The gap spacing created between adjacent wraps of the wire will depend on the diameter of the wire used to wrap the rod. In the coating apparatus used in the above examples, the wire-wound rod is placed at a substantially constant downward pressure on top of the substrate, and then polymer solution is deposited by pipette onto the substrate surface in front of the rod. A linear actuator drives the rod across the substrate surface at a constant rate spreading the coating on the substrate. The thickness of the wet coating deposited on the substrate surface will depend on the diameter of the wire used to wrap the rod. Wire diameters used ranged from 0.05 to 0.3 mm allowing controlled wet film deposits ranging from about 4 micron to about 24 micron. The coating settles by gravity into a film of substantially uniform wet thickness, after which the material is dried and cured to remove the solvent and create a coated substrate with a consistent dry coating thickness and coating loading. Further refinement in the coating loading can be achieved by altering the solids content, viscosity, density, and surface tension properties of the solution used.

The present membranes are particularly suitable for use in enthalpy exchangers, but may also be suitable for other applications involving exchange of moisture and optionally heat between gas streams with little or no mixing of the gas streams through the membrane. Such potential applications include house wrap, lumber wrap, fuel cell humidifiers, gas drying, dehumidification, medical gas humidification, desalination and airplane humidification, water filtration, gas separation, and flue gas heat and water recovery.

The present membranes are preferably coated on just one surface with a thin layer of water permeable polymer to give an anisotropic membrane as described above. However, membranes with different properties and water transport characteristics can be obtained by applying the above-described coatings to both sides of the substrate, to provide a thin surface layer of water permeable polymer formed on both sides of the substrate. For some enthalpy wheel applications it may be sufficient to use the porous desiccant-loaded substrate without the polymer coating.

While particular cartridges, embodiments and applications of the present invention have been shown and described, it will be understood, of course, that the invention is not limited thereto since modifications can be made by those skilled in the art without departing from the scope of the present disclosure, particularly in light of the foregoing teachings.

What is claimed is:

1. A water transport membrane comprising a porous silica-loaded polyethylene substrate with a coating comprising a cross-linked, water permeable, non-ionic polyurethane-polyether polymer formed on one surface thereof, wherein said silica loading is the range of 45% to 80% by weight of said substrate.

2. The membrane of claim 1 wherein the loading of said coating is in the range of about 0.1 g/m$^2$ to about 15 g/m$^2$.

3. The membrane of claim 1 wherein the loading of said coating is in the range of about 0.5 to about 5 g/m$^2$.

4. The membrane of claim 1 wherein the thickness of said substrate is in the range of about 40 micron to about 150 micron, and said substrate has greater than about 50% porosity.

5. The membrane of claim 1 wherein the loading of said coating is in the range of about 0.25 g/m$^2$ to about 15 g/m$^2$, and the thickness of said substrate is in the range of about 40 micron to about 150 micron.

6. A water transport membrane comprising a porous substrate with a coating formed on one surface thereof, wherein said substrate comprises a desiccant-loaded polyolefin film, said dessicant selected from the group consisting of silica and titania, and wherein said coating comprises a water permeable polymer, wherein said water permeable polymer comprises a cross-linked, non-ionic polyurethane-polyether polymer, wherein said desiccant loading is in the range of 45% to 80% by weight of said substrate.

7. The water transport membrane of claim 6 wherein said desiccant is silica.

8. The water transport membrane of claim 6 wherein said water transport membrane is substantially air-impermeable.

9. The water transport membrane of claim 6, wherein said polyolefin film is selected from the group consisting of polyethylene film, polypropylene film, and polyvinylchloride film.

* * * * *